United States Patent [19]

Bly

[11] 4,051,370
[45] Sept. 27, 1977

[54] OPTICAL SYSTEM FOR THERMAL IMAGER

[75] Inventor: Vincent T. Bly, Alexandria, Va.

[73] Assignee: The United States of America as represented by the Secretary of the Army, Washington, D.C.

[21] Appl. No.: 717,080

[22] Filed: Aug. 24, 1976

[51] Int. Cl.² .......................... H01J 31/50; G02F 1/13
[52] U.S. Cl. ................................ 250/331; 250/333; 350/160 LC
[58] Field of Search ........................ 250/331, 333; 350/160 LC

[56] References Cited

U.S. PATENT DOCUMENTS

| 3,829,684 | 8/1974 | Assouline et al. | 250/331 X |
| 3,832,033 | 8/1974 | Furuhata et al. | 250/331 X |
| 3,936,640 | 2/1976 | Haas et al. | 250/331 X |

Primary Examiner—Archie R. Borchelt
Attorney, Agent, or Firm—Nathan Edelberg; John E. Holford; Robert P. Gibson

[57] ABSTRACT

An infrared chopper device for use with a starting thermal imaging system, such as a pyroelectric vidicon, is provided which utilizes liquid crystal technology.

7 Claims, 7 Drawing Figures

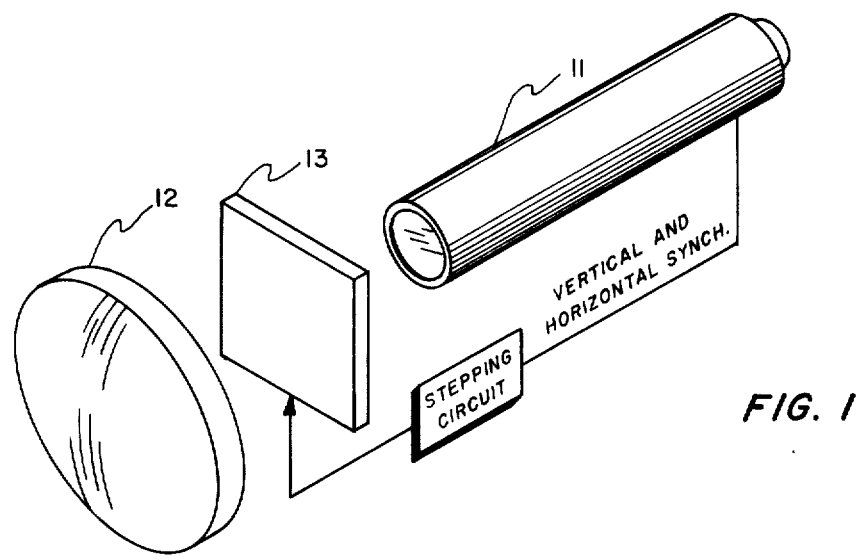
FIG. 1
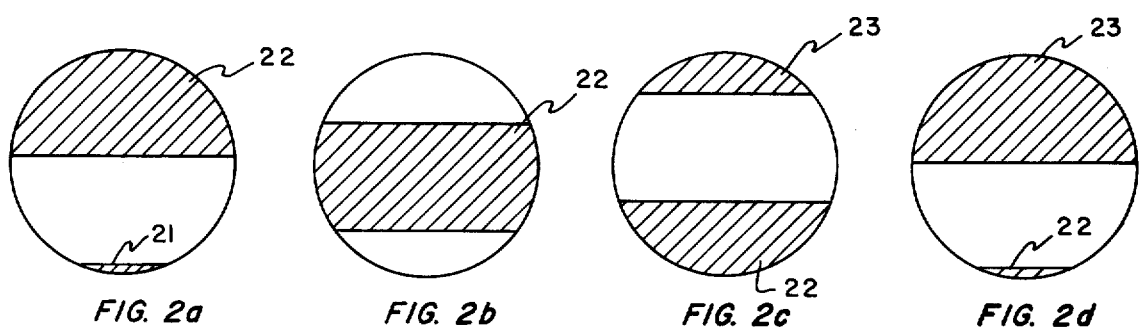
FIG. 2a  FIG. 2b  FIG. 2c  FIG. 2d
FIG. 2
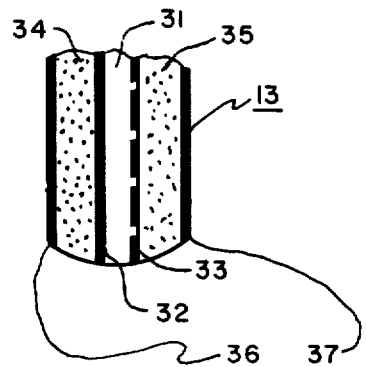
FIG. 3

OPTICAL SYSTEM FOR THERMAL IMAGER

The invention described herein may be manufactured, used, and licensed by the U. S. Government for governmental purposes without the payment of any royalties thereon.

BACKGROUND OF THE INVENTION

The majority of current thermal imagers use semiconducting diode detectors formed from materials such as indium antimonide or lead-tin-telluride. In most of these, an array of one to approximately one hundred of these semiconducting detectors is mechanically scanned to form a complete image. Also, the detectors must be cryogenically cooled (to $\simeq$ 70° K to 190° K) to perform adequately. In spite of these complexities, this approach is preferred — at present — because of the greater sensitivity and higher spatial resolution, compared to alternative approaches.

The major alternative system — at present — is the pyroelectric vidicon. This device requires the incident infrared (IR) radiation to be modulated in time to provide the required changes in electronic polarization in the target material, either by chopping the incident radiation or panning the image slowly.

In spite of this drawback the pyroelectric vidicon still holds great promise as a replacement for diode type devices. It is inherently simple, low cost, highly reliable and requires much less power to operate. Except for the mechanical devices used to chop or pan the image, a vidicon system also involves less weight and less initial cost, particularly over those systems which must operate at cryogenic temperatures. The useful sensitivities of current pyroelectric target materials have been extended from the visible or shorter wavelength spectral regions to the region between 8 - 14 micrometers. See R. D. Hudson, *Infrared System Engineering*, (John Wiley & Sons, New York, 1969); and P. W. Kruse, et al., *Elements of Infrared Technology*, (John Wiley & Sons, New York, 1962). The above limitations are at present viewed as a materials problem, any or all of which may be improved or eliminated in the future, see for example: L. E. Garn and E. J. Sharp, IEEE Transactions on Parts, etc, Vol. PHP-10, No. 4, Dec. 1974.

The pyroelectric vidicon inherently presents a moving target indication (MTI), however, in most applications it is desirable to have a stationary output image. This has been accomplished by panning the input in an orbital fashion and electronically stabilizing the output image, as shown for example in patent application Ser. No. 663,033, "Electronic Motion Compensation for the Pyroelectric Vidicon," filed Mar. 2, 1976, by John T. Hall. Although this accomplishes the desired end, the advantages of simplicity, low weight, etc. inherent in the pyroelectric approach, are at least partially lost. Attempts to make a competitive system using a chopped input have, so far, been unsuccessful. Using a chopper with a 50% duty cycle should decrease the signal and sensitivity by a factor of 2 (since the system is limited by amplifier noise or electron beam noise, and *not* by input photon noise). However, experimentally the degradation has been about 2 for medium spatial frequencies and as high as 5 for high spatial frequencies, see: Rex Watton, et al, IEEE Transactions on Electronics Devices, Vol. ED-21, No. 8, Aug. 1974.

One current hypothesis for this observed behavior is that the chopper — being at some arbitrary temperature, not necessarily near the mean value of the input scene, causes a significant temperature change over the entire pyroelectric surface and consequently acts as a dc offset, decreasing the effective sensitivity. A second significant problem with chopping derives from the fact that the chopping rate — for practical applications — is much faster than the reciprocal of the thermal time constant of the pyroelectric surface, thereby causing significant variation in response across the sequentially read surface. This is due to the large variations in integration time between the end of the chopped period and the time when different portions of the surface are readout; those areas read last will have had time to go through a larger temperature change than those read first, with a corresponding change in output signal level.

The invention is described below as it might be applied to the pyroelectric vidicon, or any parallel input - serial output system. Howeber, it should be noted that the same device — without the "moving window" feature — is also applicable to an all parallel systems.

BRIEF DESCRIPTION OF THE INVENTION

This invention consists of a method of chopping an input thermal image in a manner compatible with the requirements of pyroelectric vidicon. There is also provided a simple mechanism by which this may be accomplished.

BRIEF DESCRIPTION OF THE DRAWINGS

This invention is best understood with reference to the accompanying drawings wherein:

FIG. 1 shows a complete vidicon system according to the present invention.

FIGS. 2a - 2d show the field of view presented to vidicon tube 11 in FIG. 1 due to the variations in shutter 13 over one cycle of stepping circuit 14;

FIG. 3 shows a cross sectional view of the shutter 13 in FIG. 1; and

DESCRIPTION OF INVENTION

Figure 4:
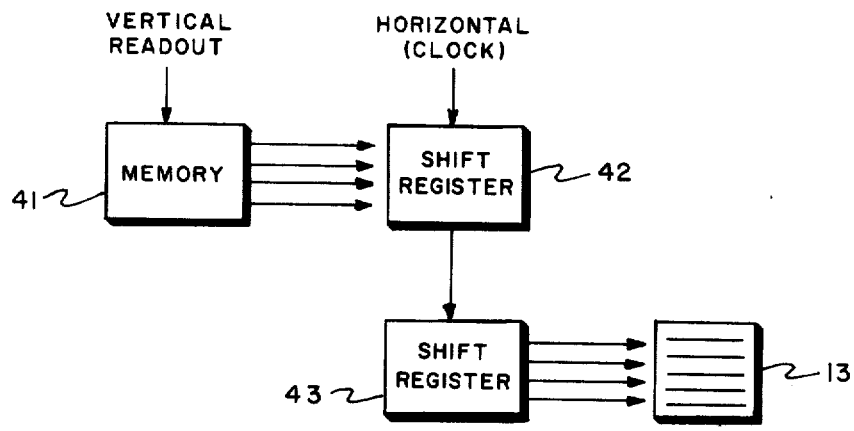
FIG. 4 shows one possible implementation of the stepping circuit of FIG. 1.

Referring specifically to FIG. 1, there is shown a complete pyroelectric vidicon system according to the present invention. The heart of the system is a pyroelectric vidicon tube 11 containing a target of a material which exhibits electric polarization when subjected to a variation in photon flux. An electron gun such as used in other types of vidicons or cathode ray tubes together with suitable deflection circuitry is included in the tube to scan the target from the rear while the above flux strikes the front. The result is a variation in the electron beam which can be transmitted as a TV signal to a monitor such as a TV receiver. Details of such a system are shown in the patent application by John T. Hall mentioned above.

The optical portion of the system with which this invention is concerned primarily consists of a lens 12 which focuses the image on the pyroelectric target in the vidicon tube, a shutter 13, and a stepping circuit 14 which operates in response to the horizontal and vertical synchronization signals from the vidicon to program the shutter action. The shutter, contrary to previous electro-mechanical shutters does not completely block off the incident photons. Rather the modulation at any point in the image plane will be equal to the ratio of the incident flux from the corresponding object point, to the mean value of the flux from a blurred region surrounding the point.

FIGS. 2a - 2d show the effective position of applicant's shutter during one cycle of the vertical synchronizing pulses. The shutter consists of a defocused or blurred band 22 across the image surface. For a system reading out sequential horizontal scan lines, the blurred band is horizontal. The total vertical height of the band is preferably one half of the vertical field of view (FOV). This band moves vertically down the surface as shown in synchronization with the reading beam. In order to maintain the total vertical height, as noted above, when the top of the blurred band 22 falls below the vertical midpoint a complimentary height blurred band 23 begins to appear at the top. This blurred band or region would be so synchronized with the scanning that the read beam — at any given time — would lie near its leading or trailing edge; these two alternatives giving signals of opposite sign. It might be desirable to read both; this would be equivalent to scanning with a normal 2 to 1 interlace, however, one of the interlaced frames would need to be inverted, a trivial electronic process.

It is evident that by "chopping" with a blurred or defocused region rather than an obscuring chopper, that the mean temperature of the "chopped" portion of the cycle is automatically the same as the mean temperature of the "unchopped" portion. Also by using a vertically moving region in synchronization with the read out, the effective integration time is virtually uniform for all positions on the surface. Therefore, this shutter solves the principals problems associated with the chopping described above.

FIG. 3 shows a cross-section of the shutter 13 from 1. The active portion is a nematic liquid crystal 31 used in the dynamic scattering mode. One side of the crystal contacts a common transparent electrode 32 consisting of a thin layer of tin oxide; and the opposite side contacts a plurality of narrow strip conductors of the same material also transparent and arranged in parallel. The number of strip conductors is preferably equal to the number of horizontal synch pulses between two subsequent vertical synch pulses or a convenient submultiple thereof. The electrodes are attached to the inner faces of two broad flat sidewalls 34 and 35 of an insulating transparent cell enclosing the liquid crystal 31. The term transparent as used herein includes materials that pass light having wavelengths in the 10 - 100 micron region. The sidewalls are joined by a narrow sidewall (not shown) in the usual manner well known in the liquid crystal art. Since the preferred embodiment is for use with far infrared, the cell could be made from any structurally stable non porous far infrared transmitting material such as polycrystalline zinc selenide commonly known as IRTRAN-4. A non reflective coating, many of which are well known in the art, may be added to the outer surfaces to make the device more efficient.

FIG. 4 shows one embodiment of the stepping circuit of FIG. 1. In this embodiment it is assumed that the number of strip electrodes is identical to the number of horizontal synch pulses occurring between vertical pulses even though only four or five are shown. Were this not so, a simple electronic divider readily available commercially as an integrated circuit would be used to reduce the pulses to the number of strips. Each strip in the blurred region must have a positive voltage which can logically be referred to a (1) condition. The remaining electrodes are in a no voltage or (0) condition.

These conditions may be treated as bits in a binary word which can be stored in a memory circuit 41. A vertical pulse is fed to the memory causing it to readout in parallel to a shift register 42. The horizontal pulses are then used as a clock to produce serial readout of register 42. As these pulses are serially fed into register 43 the same word pattern will be produced in the shutter. Since there are in fact memories which provide all of the functions of elements 41 - 43 the entire arrangement should require only one integrated circuit, for example. The entire unit may be powered by batteries or other suitable power supply.

Liquid crystal technology is currently centered on visible light applications. Although absolute transmission data in the infrared is not immediately available the general transmission characteristics can be estimated from the known common chemical structures associated with these compounds and their characteristic absorption spectra. The region from approximately 800 $cm^{-1}$ to 1100 $cm^{-1}$ or approximately 9u to 12.5u is reasonably free of strong absorption bands and the thickness required for practical dynamic scattering cells are on the order of 10u thick and have been made as thin as 6u, see: L. A. Goodman, J. Vac., Sci., Technol., Vol., 10, No. 5 Sept./Oct. 1973. It is, therefore, obvious that an operating cell can be made with a practical overall transmission over the 8-14u region. The temporal response of dynamic scattering cells is limited by the decay time (the rise time is much faster). A typical cell, approximately 12u thick with an applied voltage of 45 volts has a decay time (to 10%) of approximately 60 msec. Also the decay time is approximately proportional to the square of the cell thickness. See H. S. Schindler, "Liquid-Crystal Dynamic Scattering for Display Devices," RCA/Solid State Div., Somerville, NJ, Apr./May 1972. Therefore, a 6u cell would have a decay time of approximately 15 msec, which is sufficiently fast for practical applications.

Many other modifications of the above described method and apparatus will obviously occur to those skilled in the art, but the present invention is limited only by claims which follow.

I claim:

1. A liquid crystal shutter-like device comprising:
    a cell filled with a neumatic liquid crystal having first and second transparent nonconductive broad flat walls; spaced a small distance apart and sealed at their edges by a narrow edge wall;
    a transparent common electrode covering the major portion of the inner surface of the first of said flat walls;
    a plurality of independent transparent electrodes each covering a separate portion of said second wall;
    a plurality of external terminals sealed through at least one of said walls, each terminal being completely insulated from the others and each contacting a different one of said electrodes.

2. The device according to claim 1 further comprising:
    a bipolar source of fixed dc voltage having one pole directly connected to said common terminal; and
    a stepping circuit coupling the remaining pole of said source to said independent electrodes to provide a varying pattern of voltages thereon.

3. The device according to claim 2 further wherein:
    said independent electrodes form an array of parallel horizontal strips.

4. The device according to claim 3 further comprising:
- a vidicon tube having an image forming lens, a target of pyroelectric material and circuit means to sweep an electron beam over the target horizontally and vertically to produce a TV type signal; and
- a stepping circuit comprises means to apply a pattern of voltages to said strips and vertically shift said pattern in synchronism with the vertical scan rate of said vidicon.

5. The device according to claim 4 wherein said stepping circuit comprises:
- a first shift register having a separate one bit output coupled to each of said strip electrodes;
- a second shift register having an equal capacity to said first register serially coupled thereto; and
- a read-only memory circuit also having said equal storage capacity preprogrammed with said pattern of voltages with its outputs coupled in parallel to said second shift register, said registers and memory circuit having their shift and readout inputs coupled to said vidicon whereby each horizontal synch signal shifts the registers one bit and each vertical synch signal causes a complete readout of the memory circuit.

6. A method of detecting a light image from a distant object comprising the steps of:
- projecting light received from said object onto the target of a pyroelectric vidicon tube;
- scanning said target with at least one beam of electrons; and
- periodically focussing and defocussing said light at individual portions of said target such that said portions are focussed for a storage period commencing prior to and including any readout period when they are being scanned by an electron beam and are defocussed for a given period between each of said storage periods.

7. The method according to claim 6 wherein:
said storage periods and said given periods are equal.

* * * * *